(12) United States Patent
Anderson (10) Patent No.: US 8,226,124 B2
(45) Date of Patent: Jul. 24, 2012

(54) MOBILE FLUID STORAGE TANK WITH VERTICALLY ADJUSTABLE HITCH AND REAR SUPPORT WHEELS

(76) Inventor: Jess D. Anderson, Gillette, WY (US)

(*) Notice: Subject to any disclaimer, the term of this patent is extended or adjusted under 35 U.S.C. 154(b) by 107 days.

(21) Appl. No.: 12/949,364

(22) Filed: Nov. 18, 2010

(65) Prior Publication Data

US 2011/0121555 A1    May 26, 2011

Related U.S. Application Data

(60) Provisional application No. 61/263,359, filed on Nov. 21, 2009.

(51) Int. Cl.
*B60P 3/22* (2006.01)
(52) U.S. Cl. .................................................. 280/837
(58) Field of Classification Search .................. 280/837, 280/838, 839
See application file for complete search history.

(56) References Cited

U.S. PATENT DOCUMENTS

| | | | |
|---|---|---|---|
| 2,475,443 A | 7/1949 | Bill | |
| 2,751,234 A | 6/1956 | Couse | |
| 2,858,950 A | 11/1958 | Martin | |
| 3,429,585 A | 2/1969 | Ross | |
| 3,633,776 A | 1/1972 | Moore | |
| 3,795,336 A | 3/1974 | Acker et al. | |
| 3,834,111 A | 9/1974 | Acker et al. | |
| 3,884,494 A | 5/1975 | Ashby et al. | |
| 3,929,241 A | 12/1975 | Putnam | |
| 4,120,513 A | 10/1978 | Hurt | |
| 4,154,453 A | 5/1979 | Du Bois | |
| 4,199,298 A | 4/1980 | Webre, Jr. et al. | |
| 4,318,549 A | 3/1982 | Pletcher | |
| 4,406,471 A | 9/1983 | Holloway | |
| 4,819,955 A | 4/1989 | Cobb | |
| 5,004,269 A | 4/1991 | Pelt | |
| 5,192,101 A | 3/1993 | Richardson | |
| 5,326,214 A | 7/1994 | Swisher, Jr. | |
| 5,653,469 A | 8/1997 | Wade | |
| 5,957,500 A | 9/1999 | Wade | |
| 6,199,910 B1 * | 3/2001 | Wade | 280/837 |
| 6,390,325 B1 | 5/2002 | Gonzales | |
| 6,857,643 B2 | 2/2005 | Neider | |
| 7,112,029 B1 | 9/2006 | Neatherlin | |

* cited by examiner

*Primary Examiner* — Tony Winner
(74) *Attorney, Agent, or Firm* — Jeffrey L. Thompson; Thompson & Thompson, P.A.

(57) ABSTRACT

A mobile fluid storage tank has a tank body with front, rear, and main body sections. A hitch structure is located beneath the front section and is supported by a first swing arm assembly. Rear support wheels are located beneath the rear section and are supported by a second swing arm assembly. A support frame extends along a bottom side of the main body section. The swing arm assemblies are moveable by air bag actuators between raised and lowered positions. The air bag actuators are operable to move the tank body between a lowered field position in which the support frame rests on the ground, and a raised transport position in which the support frame is supported above the ground by the hitch structure and the rear wheels. Pedestals are used to lock the swing arm assemblies in their transport positions when the air bag actuators are deflated.

20 Claims, 8 Drawing Sheets

MOBILE FLUID STORAGE TANK WITH VERTICALLY ADJUSTABLE HITCH AND REAR SUPPORT WHEELS

RELATED APPLICATIONS

This application claims priority of U.S. Provisional Application No. 61/263,359 filed on Nov. 21, 2009. The entire content of this prior application is incorporated herein by reference.

BACKGROUND OF THE INVENTION

1. Field of the Invention

The present invention relates generally to mobile fluid storage tanks, and in particular, to mobile fluid storage tanks commonly known as frac-tanks used in the oil and gas industry.

2. Description of the Related Art

Mobile fluid storage tanks, commonly known as frac-tanks, are used in the oil and gas industry for storing and dispensing fluids at oil and gas well sites. Examples of such storage tanks are disclosed in U.S. Pat. Nos. 4,406,471, 5,653,469, and 5,957,500. These storage tanks are typically large heavy gauge steel tanks that are towed by truck from one site to another. These storage tanks are also sometimes used for environmental clean-up jobs and to hold fluids and chemicals at industrial sites.

Conventional frac-tanks have a fixed hitch assembly at a front end, a rear wheel suspension assembly at a rear end, and a tank body between the front and rear ends. The frac-tanks are normally designed to be towed only while they are empty, and to be rested flat upon the ground when they are in use for storing fluid at a well site or the like. To tow a conventional frac-tank, a truck having a winch is normally required to lift the front end of the tank so that the hitch structure can be coupled with a mating fifth wheel hitch of the truck. With the front end of the tank lifted, the rear wheels of the conventional frac-tank are engaged with the ground and support the rear end of the tank body above the ground for transport.

Conventional frac-tanks are inconvenient to move from one location to another because a special winch truck is required to lift the front of the tank for coupling with the truck, and such winch trucks are not always readily available at the job site. Also, conventional frac-tanks often must be made with shorter dimensions at the front end of the tank body to limit the height of the tanks during transport, thereby reducing the holding capacity of the tanks.

There is a need in the industry for an improved frac-tank that can be towed from one location to another using a conventional semi tractor, and that can be made with a larger storage capacity without exceeding the legal size limits for over-the-road transport.

SUMMARY OF THE INVENTION

An object of the present invention is to provide a mobile fluid storage tank that does not require a special winch truck to lift the front of the tank for coupling with a truck, that can be conveniently moved from one location to another using a conventional semi tractor, and that can be made with a larger storage capacity without exceeding legal size limits.

To accomplish these and other objects of the present invention, a mobile fluid storage tank is provided having a tank body with front, rear, and main body sections. A hitch structure is located beneath the front section and is supported by a first swing arm assembly. Rear support wheels are located beneath the rear section and are supported by a second swing arm assembly. A support frame extends along a bottom side of the main body section. The swing arm assemblies are moveable by air bag actuators between raised and lowered positions. The air bag actuators are operable to move the tank body between a lowered field position in which the support frame rests on the ground, and a raised transport position in which the support frame is supported above the ground by the hitch structure and the rear wheels. Pedestals are used to lock the swing arm assemblies in their transport positions when the air bag actuators are deflated.

According to one aspect of the invention, a mobile fluid storage tank is provided, comprising: a tank body having a front section, a rear section, and a main body section between the front and rear sections; a hitch structure located beneath the front section; rear support wheels located beneath the rear section; and a support frame extending along a bottom side of the main body section. The hitch structure is supported by a first swing arm assembly, the rear support wheels are supported by a second swing arm assembly, and the first and second swing arm assemblies are moveable by respective actuators between raised and lowered positions. The actuators are operable to move the tank body between a lowered field position in which the support frame rests on the ground and a raised transport position in which the support frame is supported above the ground by the hitch structure and the rear wheels.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

Figure 1:
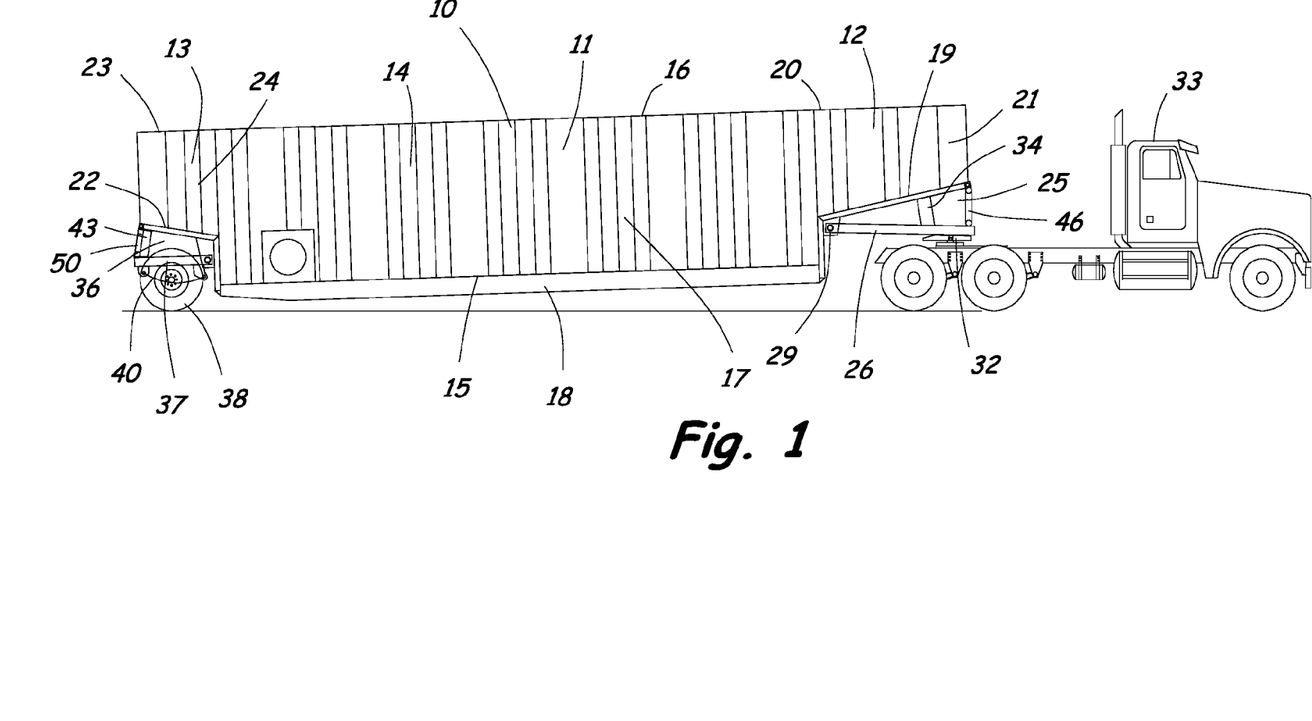
FIG. 1 is a side elevation view of a mobile fluid storage tank of the present invention coupled with a semi tractor, with the tank supported in a raised transport position.
Figure 2:
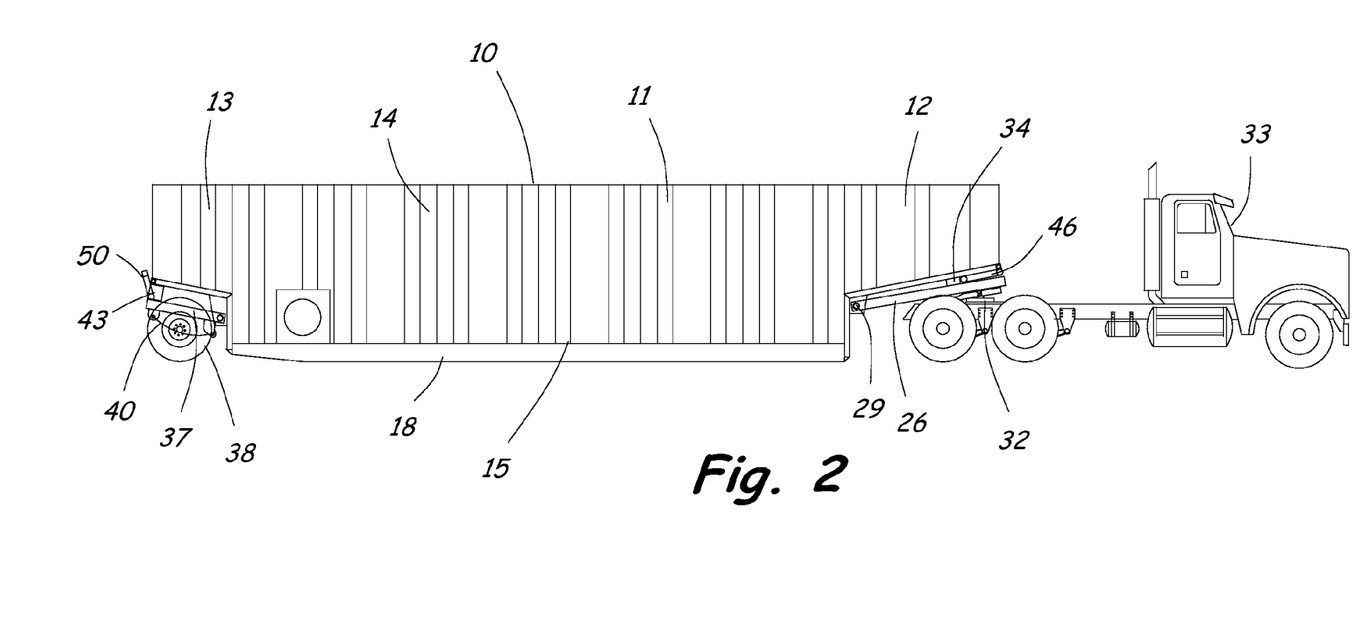
FIG. 2 is a side elevation view of the mobile fluid storage tank coupled with a semi tractor, with the tank in a lowered field position.
Figure 3:
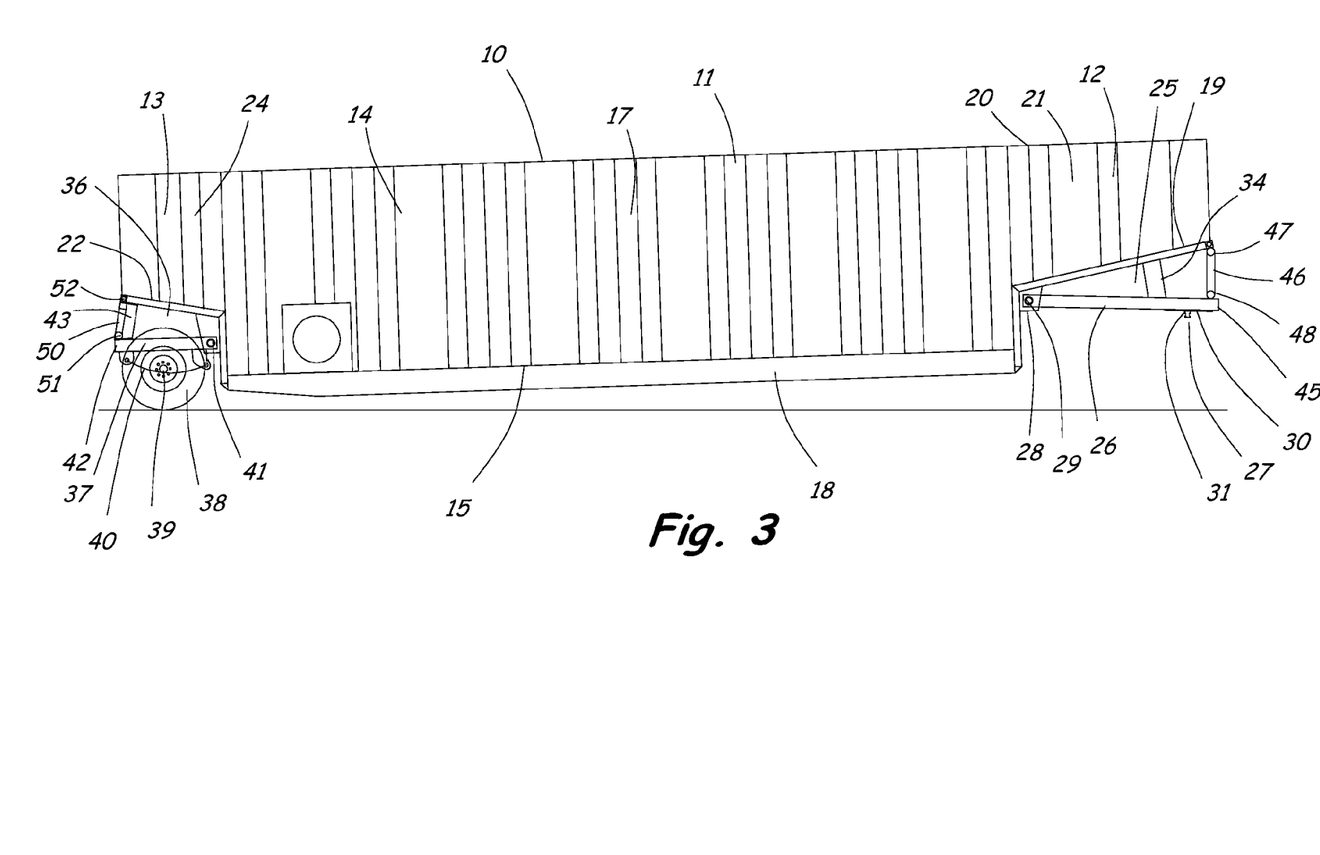
FIG. 3 is a side elevation view of the mobile fluid storage tank shown in FIG. 1, with the tank in a raised transport position.
Figure 4:
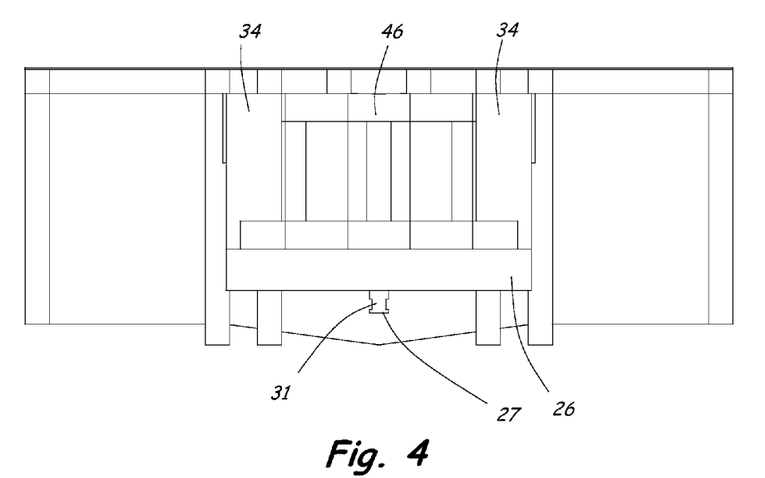
FIG. 4 is a front detail view of the front swing arm assembly and hitch structure at the front of the mobile fluid storage tank, with the tank in a raised transport position.
Figure 5:
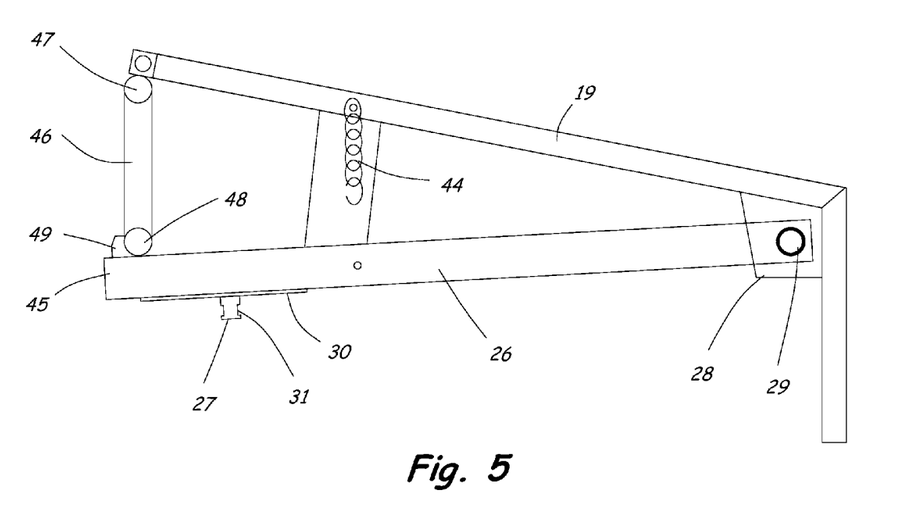
FIG. 5 is a side detail view of the front swing arm assembly and hitch structure at the front of the mobile fluid storage tank, with the tank in a raised transport position.
Figure 6:
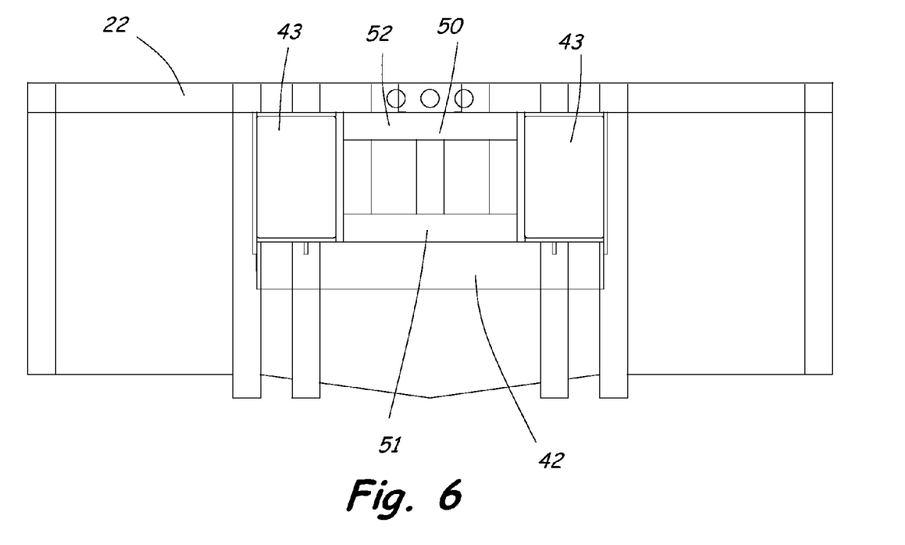
FIG. 6 is a rear detail view of the rear swing arm assembly and actuator at the rear of the mobile fluid storage tank, with the tank in a raised transport position.
Figure 7:
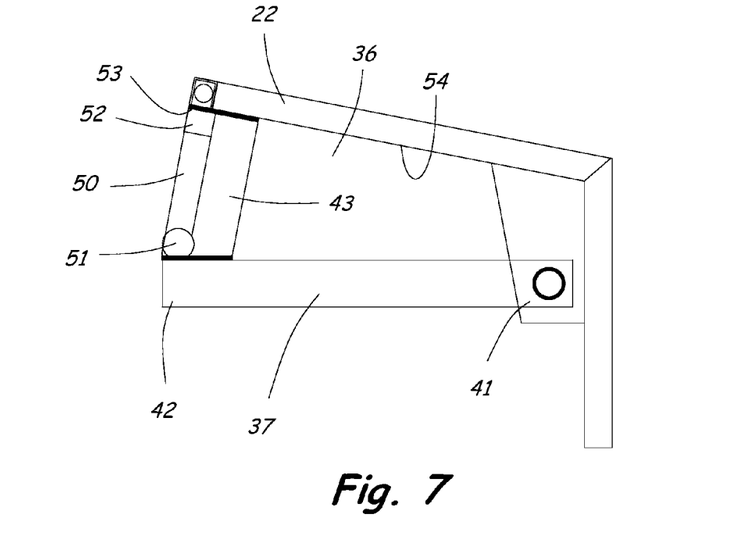
FIG. 7 is a side detail view of the rear swing arm assembly and actuator at the rear of the mobile fluid storage tank, with the tank in a raised transport position.
Figure 8:
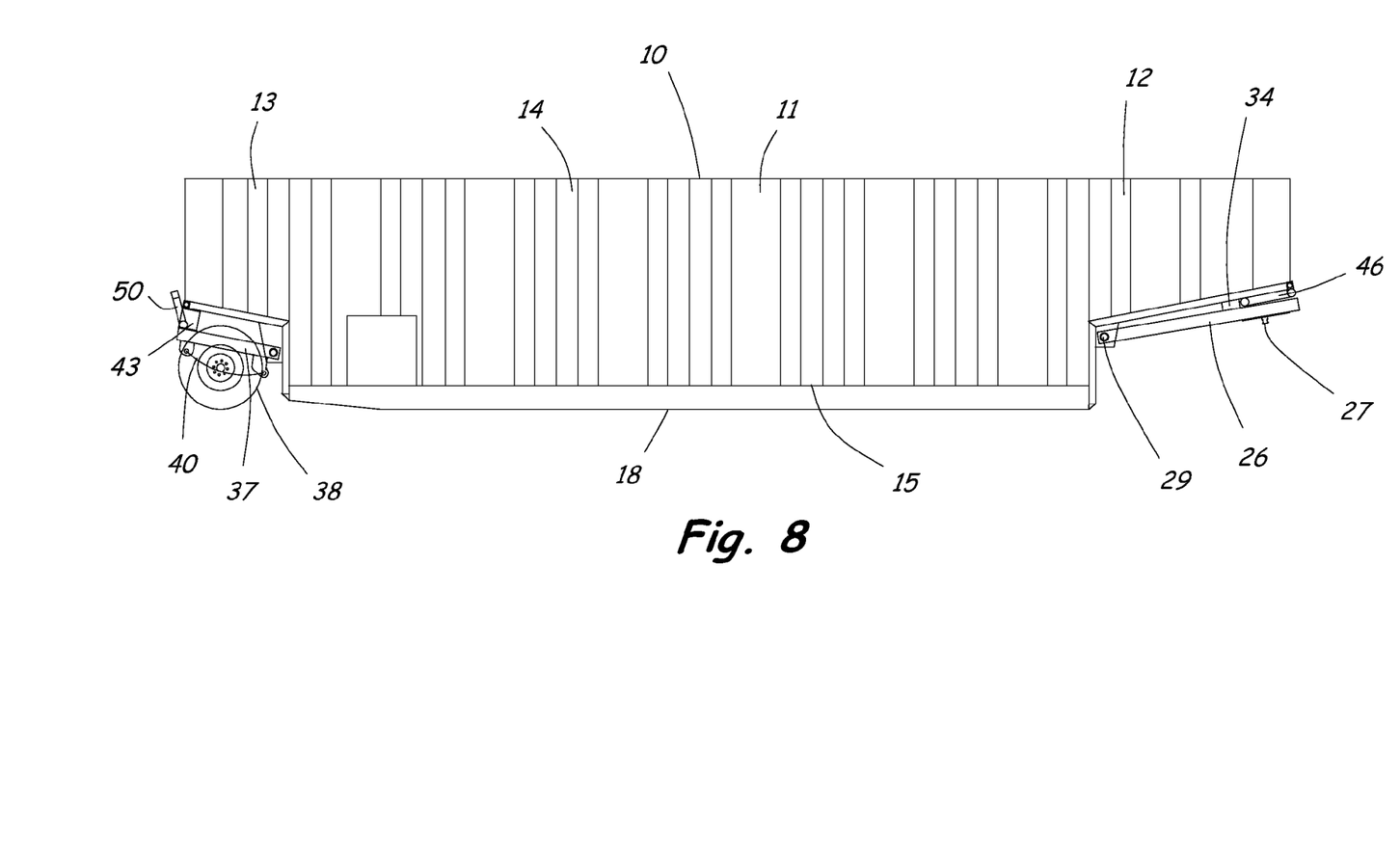
FIG. 8 is a side elevation view of the mobile fluid storage tank shown in FIG. 1, with the tank in a lowered field position.
Figure 9:
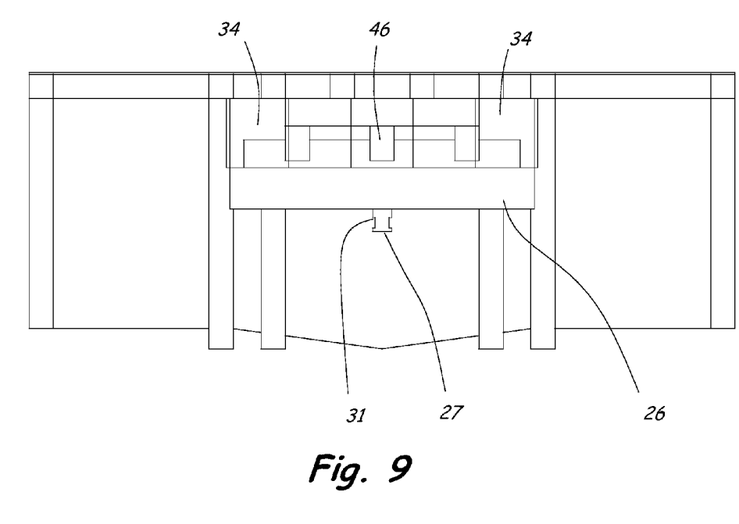
FIG. 9 is a front detail view of the front swing arm assembly and hitch structure at the front of the mobile fluid storage tank, with the tank in a lowered field position.
Figure 10:
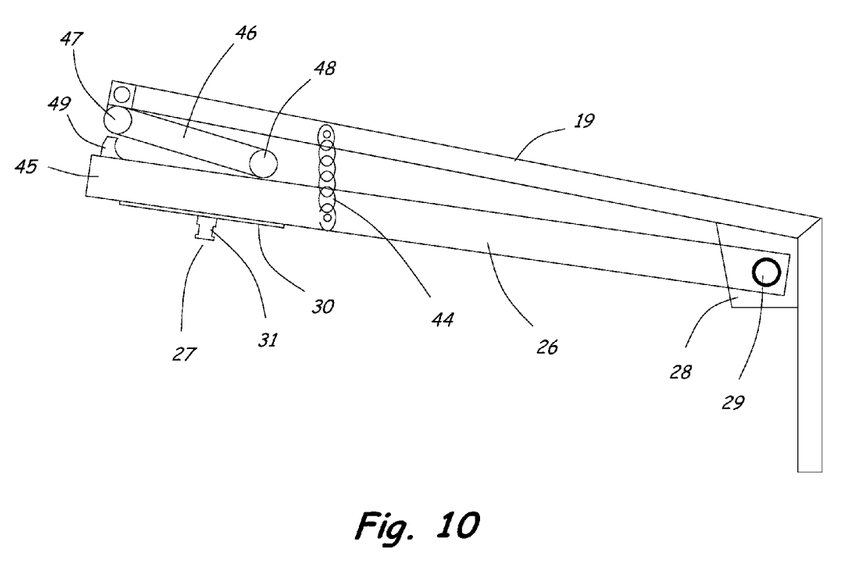
FIG. 10 is a side detail view of the front swing arm assembly and hitch structure at the front of the mobile fluid storage tank, with the tank in a lowered field position.
Figure 11:
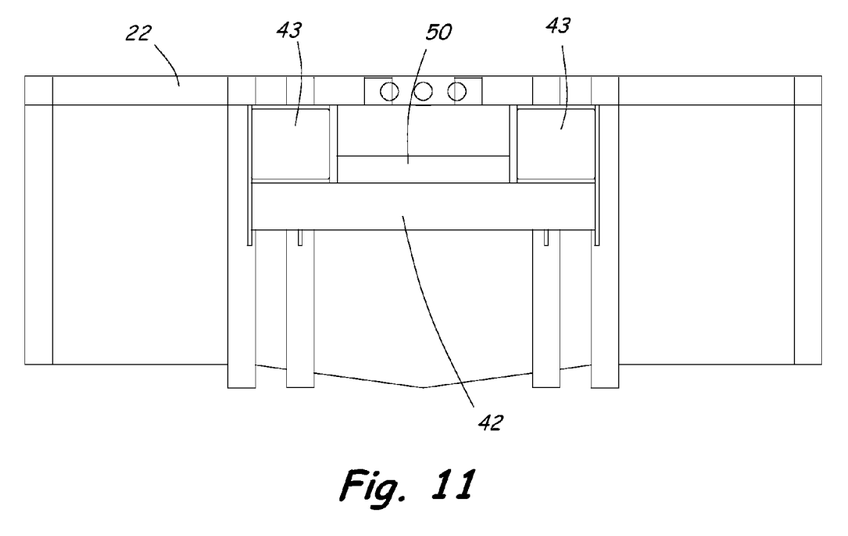
FIG. 11 is a rear detail view of the rear swing arm assembly and actuator at the rear of the mobile fluid storage tank, with the tank in a lowered field position.
Figure 12:
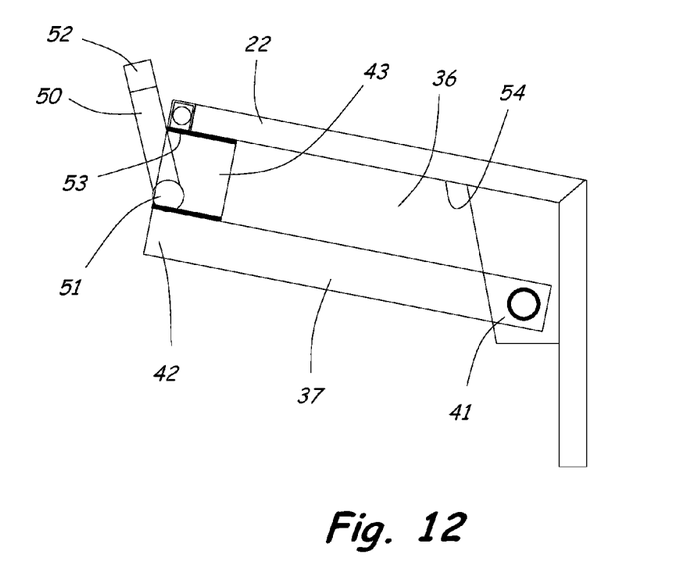
FIG. 12 is a side detail view of the rear swing arm assembly and actuator at the rear of the mobile fluid storage tank, with the tank in a lowered field position.

A mobile fluid storage tank 10 according to the present invention will now be described in detail with reference to FIGS. 1 to 12 of the accompanying drawings.

The mobile fluid storage tank 10 has a tank body 11 with a front section 12, a rear section 13, and a main body section 14 between the front and rear sections 12, 13. The main body section 14 has a generally rectangular cuboid configuration with a main floor 15, a main ceiling 16, and main vertical sidewalls 17 extending between the main floor 15 and the main ceiling 16. A support frame 18 extends along a bottom side of the main body section 14. The main body section 14 provides most of the capacity of the tank body 11 (e.g., thousands of gallons).

The front section 12 of the tank body 11 has a front floor 19, a front ceiling 20, and front vertical sidewalls 21 extending between the front floor 19 and the front ceiling 20. The front ceiling 20 and front vertical sidewalls 21 are generally coplanar and continuous with the main ceiling 16 and main vertical sidewalls 17, respectively. The front floor 19 is elevated above the main floor 15 and sloped downwardly in a rearward direction relative to the main floor 15.

The rear section 13 of the tank body 11 has a rear floor 22, a rear ceiling 23, and rear vertical sidewalls 24 extending between the rear floor 22 and the rear ceiling 23. The rear ceiling 23 and rear vertical sidewalls 24 are generally coplanar and continuous with the main ceiling 16 and main vertical sidewalls 17, respectively. The rear floor 22 is elevated above the main floor 15 and sloped downwardly in a forward direction relative to the main floor 15.

The space 25 created beneath the sloped front floor 19 is used to accommodate a first swing arm assembly 26 and a fifth wheel-type hitch structure 27 supported by the first swing arm assembly 26. The first swing arm assembly 26 has a rear end pivotally mounted to the tank body 11 with two plates 28 and a pin assembly 29, and a front end on which the hitch structure 27 is supported. The hitch structure 27 can be, for example, a plate 30 having a downwardly protruding king pin 31 for coupling with a conventional fifth wheel hitch 32 of a semi tractor 33.

The first swing arm assembly 26 is moveable between raised and lowered positions by a first set of actuators 34. The first set of actuators 34 are positioned between the first swing arm assembly 26 and the front section 12 of the tank body 11 for moving the hitch structure 27 relative to the tank body 11. The first set of actuators 35 are preferably air bag actuators that operate on compressed air, which is readily available on most semi tractors 33.

The space 36 created beneath the sloped rear floor 22 is used to accommodate a second swing arm assembly 37 and rear support wheels 38 supported by the second swing arm assembly 37. The rear support wheels 38 are connected to the second swing arm assembly 37 via an axle 39 and a leaf spring suspension 40. The second swing arm assembly 37 has a front end 41 pivotally mounted to the tank body 11, and a rear end 42. A second set of actuators 43 are connected between the rear floor 22 and the second swing arm assembly 37 at a location spaced from the pivotally mounted front end 41. The second set of actuators 43 are positioned between the second swing arm assembly 37 and the rear section 13 of the tank body 11 for moving the rear wheels 38 relative to the tank body 11. The second set of actuators 43 are preferably air bag actuators that can be operated on compressed air supplied from the semi tractor 33.

The first and second sets of actuators 34, 43 are operable to move the first and second swing arm assemblies 26, 37 to thereby move the tank body 11 between a lowered field position (FIGS. 2 and 8) in which the support frame 18 rests on the ground, and a raised transport position (FIGS. 1 and 3) in which the support frame 18 is supported above the ground by the hitch structure 27 and the rear wheels 38.

A chain 44 is provided for holding the first swing arm 26 up in its raised position when the hitch structure 27 is not coupled with a semi tractor 33. The chain 44 can be coupled at one end to the front floor 19 of the tank body 11 and at another end to the first swing arm assembly 26 at a location spaced from the pivot connection 29. The chain 44 functions to keep the front end 45 of the first swing arm assembly 26 from falling to the ground when the semi tractor 33 is uncoupled from the hitch structure 27 and moved away from the tank 10.

A first pedestal 46 is pivotally connected beneath the front section 12 of the tank body 11 and the front end 45 of the first swing arm assembly 26. The first pedestal 46 is moveable between a stowed position (FIGS. 2, 8, 9 and 10) and a support position (FIGS. 1, 3, 4 and 5). The first pedestal 46 has a first end 47 pivotally mounted to an underside of the front tank section 12. A second end 48 of the first pedestal 46 is tucked up against the underside of the front tank section 12 in its stowed position, and lowered into engagement with a first cradle structure 49 on the first swing arm assembly 26 in its support position. In an alternative embodiment, the first pedestal 46 could have its first end pivotally mounted to the first swing arm assembly 26 and its second end moveable into engagement with a cradle structure on the underside of the front tank section 12 of the tank body 11.

The first cradle structure 49 comprises a structure that prevents movement of the first pedestal 46 out of its support position when the first pedestal 46 is used to support the tank 10 in its raised transport position. For example, the cradle structure 49 can have an abutment member that engages the second end of the first pedestal 46 in an over-center position for locking the first pedestal 46 against movement out of its support position.

In its stowed position, the first pedestal 46 allows the front end 45 of the first swing arm assembly 26 to be moved between its lowered and raised positions. In its support position, the first pedestal 46 locks the first swing arm assembly 26 in its lowered position for maintaining the mobile fluid storage tank 10 in its raised transport position. When the first pedestal 46 is in its support position, the first set of air bag actuators 34 can be deflated so that substantially all of the vertical load carried by the hitch structure 27 is transmitted through the first pedestal 46 and the pivot connection 29 at the rear of the first swing arm assembly 26.

A second pedestal 50 is selectively moveable into a support position between the rear section 13 of the tank body 11 and the second swing arm assembly 37. The second pedestal 50 is moveable between a stowed position (FIGS. 2, 8, 9 and 10) and the support position (FIGS. 1, 3, 4 and 5). A first end 51 of the second pedestal 50 is pivotally mounted to the second swing arm assembly 37. A second end 52 of the second pedestal 50 is engaged with a second cradle structure 53 on an underside 54 of the rear section 13 of the tank body 11 when the second pedestal 50 is in its support position. In an alternative embodiment, the second pedestal 50 can have its first end pivotally connected to the rear section 13 of the tank body 11 and its second end moveable into selective engagement with a second cradle structure on the second swing arm assembly 37.

In its stowed position, the second pedestal 50 allows the rear end 42 of the second swing arm assembly 37 to be moved between its lowered and raised positions. In its support position, the second pedestal 50 locks the second swing arm assembly 37 in its lowered position for maintaining the mobile fluid storage tank 10 in its raised transport position. When the second pedestal 50 is in its support position, the second set of air bags 43 can be deflated so that substantially all of the vertical load carried by the rear wheels 38 is transmitted through the second pedestal 50 at one end of the second swing arm assembly 37 and the pivot connection 41 at the other end of the second swing arm assembly 37.

The construction of the mobile fluid storage tank 10 according to the present invention has been described above. A method of using the mobile fluid storage tank 10 will now be described.

With the tank 10 in its lowered field position and the first swing arm assembly 26 held in its raised position by the chain 44, the hitch structure 27 on the lower side of the first swing arm assembly 26 can be coupled with a fifth wheel hitch 32 of a semi tractor 33. The semi tractor 33 is backed under the front section 12 of the tank 10 until the king pin 31 of the hitch structure 27 couples with the fifth wheel hitch 32 of the semi tractor 33. The chain 44 is then removed from the first swing arm assembly 26 to allow the first swing arm assembly 26 to move between its raised and lowered positions.

The air supply from the semi tractor 33 is attached to air hose couplers on the mobile fluid storage tank 10 using, for example, a conventional "gladhand" connector. The air system on the mobile fluid storage tank 10 may include its own supply tank, which is charged from the air system on the semi tractor 33.

The operator can then lift either the front or the rear end of the tank 10 by supplying air to the air bag actuators 34, 43 associated with the first and second swing arm assemblies 26, 37, respectively. Bidirectional up/down air valves are provided to allow the operator to easily adjust the air flow to the air bag actuators 34, 43. To accommodate a limited compressed air capacity of the semi tractor 33, it may be necessary to activate the air bag actuators 34, 43 at just one end of the trailer 10 at a time.

The operator moves the air valve to the up position to allow compressed air from the air system on the mobile fluid storage tank 10 to flow into the air bag actuators 34, 43. As air is applied to the air bag actuators 34, 43 at points spaced from the pivot connections 29, 41 of the first and second swing arm assemblies 26, 37, respectively, the swing arm assemblies 26, 37 are forced to rotate relative to the tank body 11. The forced rotation of the swing arm assemblies 26, 37 causes the tank 10 to be raised from the ground. The placement of the air bag actuators 34, 43 along the swing arm assemblies 26, 37 can be determined so that a desired multiplication of the extension of the air bag actuators 34, 43 is provided as the actuators are inflated.

When the air bag actuators 34, 43 are extended to their maximum length (a point that is slightly beyond the height they would be in a transport position), the first and second pedestals 46, 50 are swung into place between the underside of the tank 10 and the swing arm assemblies 26, 37. Air pressure is then released from the air bag actuators 34, 43 using the up/down air valve, thereby allowing the tank body 11 to lower and rest on the first and second pedestals 46, 50 placed between the tank body 11 and the swing arm assemblies 26, 37. If only one end of the mobile fluid storage tank 10 is raised at a time, the same process is then repeated to raise the opposite end of the mobile fluid storage tank 10.

The first and second pedestals 46, 50 are used to provide rigid supports for the mobile fluid storage tank 10 in its raised transport position. The air bag actuators 34, 43 are fully deflated and do not provide part of the suspension of the mobile fluid storage tank 10 in its transport position. The air bag actuators 34, 43 are used only to lift and/or lower the tank body 11 and are not part of the suspension of the mobile fluid storage tank 10 during travel. The mobile fluid storage tank 10 utilizes the semi tractor suspension on the semi tractor through the hitch structure 27, and the leaf spring suspension 40 attached to the rear swing arm assembly 37 for suspension at the rear of the mobile fluid storage tank 10 during travel. With the mobile fluid storage tank 10 in its raised transport position, it can be moved from one location to another using the semi tractor 33.

To lower the mobile fluid storage tank 10 from its transport position to a position resting on the ground, the following process is used. Starting on either end of the tank 10 (or both ends at the same time), compressed air is supplied to the air bag actuators 34, 43 using the up/down air valve. The air bag actuators 34, 43 are supplied with air until the tank body 11 is raised off the first and second pedestals 46, 50 between the tank body 11 and the swing arm assemblies 26, 37. When sufficient clearance has been achieved, the first and second pedestals 46, 50 are swung from their support positions to their stowed positions. At this point, air is released from the air bag actuators 34, 43 using the up/down air valve. As air is released, the tank body 11 begins to lower, and the space between the tank body 11 and the swing arm assemblies 26, 37 is reduced. Air continues to be released from the air bag actuators 34, 43 until the bottom side 18 of the main body section 14 of the tank body 11 rests on the ground, and the air bag actuators 34, 43 are totally deflated. If only one end of the mobile fluid storage tank 10 is lowered at a time, the same process is then repeated to lower the opposite end of the mobile fluid storage tank 10.

Once the front end of the mobile fluid storage tank 10 is lowered by deflating the air bag actuators 34, the chain 44 can be reattached between the front floor 19 and the front swing arm 26 to hold the front swing arm 26 in its raised position. Once both ends of the tank 10 have been lowered to rest upon the ground, the air lines can be uncoupled from the air system of the semi tractor 33, and the semi tractor fifth wheel hitch 32 can be uncoupled from the king pin 31 of the hitch structure 27. The front swing arm 26 will be held in its raised position by the chain 44, which will facilitate coupling with the semi tractor 33 the next time the tank 10 is to be moved. The process of raising, transporting, and lowering the mobile fluid storage tank 10 is thus complete.

The air bag actuators 34, 43 used in the present invention are used only to raise the tank 10 and are not used as part of the mobile fluid storage tank's suspension during travel. Instead, the first and second pedestals 46, 50 are used to lock the swing arm assemblies 26, 37 against rotation when the mobile fluid storage tank 10 is in its raised transport position.

The tank body 11 has a unique shape that provides substantial advantages over conventional frac tanks. The sloped front and rear floors 19, 22 of the tank body 11 provide spaces 25, 36 for accommodating the front and rear swing arm assemblies 26, 37. The space 25 under the front section 12 of the tank body 11 allows a semi tractor 33 to back under the front section 12 of the tank 10. The sloped front and rear floors 19, 22 also include structures that can be used by the air bag actuators 34, 43 to push against while raising the mobile fluid storage tank 10.

The mobile fluid storage tank 10 of the present invention requires no specialized equipment to raise, lower and/or transport the tank 10. A conventional semi tractor 33 having a compressed air supply and a fifth wheel hitch 32 is all that is required to raise, lower and transport the tank 10.

Conventional frac-tanks are transported by lifting the entire front end of the trailer using a winch truck so that the frac-tank has a steep incline from front to rear during transport. In contrast, the mobile fluid storage tank 10 of the present invention can be built with additional height and capacity because it is transported in a relatively flat, level position.

While the invention has been specifically described in connection with specific embodiments thereof, it is to be understood that this is by way of illustration and not of limitation, and the scope of the application should be construed as broadly as the prior art will permit.

What is claimed is:

1. A mobile fluid storage tank comprising:
   a tank body having a front section, a rear section, and a main body section between the front and rear sections;
   a hitch structure located beneath said front section;
   rear support wheels located beneath said rear section; and
   a support frame extending along a bottom side of said main body section;
   wherein said hitch structure is supported by a first swing arm assembly, said rear support wheels are supported by a second swing arm assembly, and said first and second swing arm assemblies are moveable by respective actuators between raised and lowered positions, whereby said actuators are operable to move the tank body between a lowered field position in which said support frame rests on the ground and a raised transport position in which said support frame is supported above the ground by said hitch structure and said rear wheels.

2. The mobile fluid storage tank according to claim 1, wherein said first swing arm assembly has a rear end pivotally mounted to said tank body and a front end on which said hitch structure is supported.

3. The mobile fluid storage tank according to claim 1, wherein said main body section of said tank body has a generally rectangular cuboid configuration with a main floor, a main ceiling, and vertical main sidewalls extending between the main floor and the main ceiling.

4. The mobile fluid storage tank according to claim 3, wherein said front section of the tank body has a front floor, a front ceiling, and front vertical sidewalls extending between the front floor and the front ceiling, said front floor being elevated above said main floor and sloped downwardly in a rearward direction relative to said main floor to accommodate said first swing arm assembly and said hitch structure beneath said front floor.

5. The mobile fluid storage tank according to claim 3, wherein said rear section of the tank body has a rear floor, a rear ceiling, and rear vertical sidewalls extending between the rear floor and the rear ceiling, said rear floor being elevated above said main floor and sloped downwardly in a forward direction relative to said main floor to accommodate said second swing arm assembly and said rear wheels beneath said rear floor.

6. The mobile fluid storage tank according to claim 1, wherein said hitch structure comprises a king pin for coupling with a fifth wheel hitch.

7. The mobile fluid storage tank according to claim 1, wherein said actuators comprise at least one pneumatic actuator positioned between said first swing arm assembly and said front section of the tank body for moving said hitch structure relative to said tank body between a raised position and a lowered position.

8. The mobile fluid storage tank according to claim 7, wherein said at least one pneumatic actuator is an air bag actuator.

9. The mobile fluid storage tank according to claim 1, wherein said actuators comprise at least one pneumatic actuator positioned between said second swing arm assembly and said rear section of the tank body for moving said rear wheels between a raised position and a lowered position.

10. The mobile fluid storage tank according to claim 9, wherein said rear wheels are connected to said second swing arm assembly via a leaf spring suspension.

11. The mobile fluid storage tank according to claim 10, wherein said at least one pneumatic actuator is an air bag actuator.

12. The mobile fluid storage tank according to claim 1, further comprising a first pedestal pivotally connected beneath said front section of the tank body and said first swing arm assembly, said first pedestal being moveable between a stowed position and a support position, wherein in said stowed position said first pedestal allows a front end of said first swing arm assembly to be moved to its raised position, and in said support position said first pedestal locks the first swing arm assembly in its lowered position for maintaining the mobile fluid storage tank in its raised transport position.

13. The mobile fluid storage tank according to claim 12, wherein the actuator for moving said first swing arm assembly comprises at least one air bag actuator, and wherein a front end of said mobile fluid storage tank is maintained in its raised transport position by said first pedestal when said at least one air bag actuator is deflated.

14. The mobile fluid storage tank according to claim 12, wherein said first pedestal has a first end pivotally mounted to one of said front tank section and said first swing arm assembly, and a second end that is moved into engagement with the other of said front tank section and said first swing arm assembly when the first pedestal is moved into its support position.

15. The mobile fluid storage tank according to claim 14, wherein said first end of said first pedestal is pivotally mounted to an underside of said front tank section, and said second end of said first pedestal is tucked up against the underside of said front tank section in said stowed position and lowered into engagement with a first cradle structure on said first swing arm assembly in said support position.

16. The mobile fluid storage tank according to claim 15, wherein said first cradle structure comprises a means for preventing movement of said first pedestal out of its support position when said first pedestal is used to support the tank in its raised transport position.

17. The mobile fluid storage tank according to claim 1, further comprising a second pedestal pivotally connected between said rear section of the tank body and said second swing arm assembly, said second pedestal being moveable between a stowed position and a support position, wherein in said stowed position said second pedestal allows a rear end of said second swing arm assembly to be moved to its raised position, and in said support position said second pedestal locks the second swing arm assembly in its lowered position for maintaining the mobile fluid storage tank in its raised transport position.

18. The mobile fluid storage tank according to claim 17, wherein the actuator for moving said second swing arm assembly comprises at least one air bag actuator, and wherein a rear end of said mobile fluid storage tank is maintained in its raised transport position by said second pedestal when said at least one air bag actuator is deflated.

19. The mobile fluid storage tank according to claim 17, wherein said second pedestal has a first end pivotally mounted to one of said rear tank section and said second swing arm assembly, and a second end that is moved into engagement with the other of said rear tank section and said second swing arm assembly when the second pedestal is moved into its support position.

20. The mobile fluid storage tank according to claim 19, wherein said first end of said second pedestal is pivotally mounted to said second swing arm assembly, and said second end of said second pedestal is engaged with a second cradle structure on an underside of said rear section of said tank body when the second pedestal is in its support position.

\* \* \* \* \*